Aug. 4, 1936.  C. R. WILSON  2,049,482
AIRCRAFT
Filed July 3, 1934  2 Sheets-Sheet 1

Inventor:
Christopher Robert Wilson,
By [signature]
Attorney

Aug. 4, 1936.                C. R. WILSON                2,049,482
                              AIRCRAFT
                          Filed July 3, 1934           2 Sheets-Sheet 2
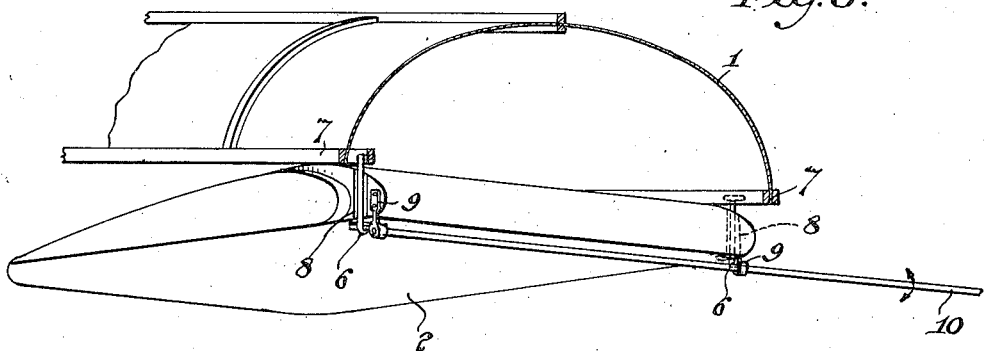
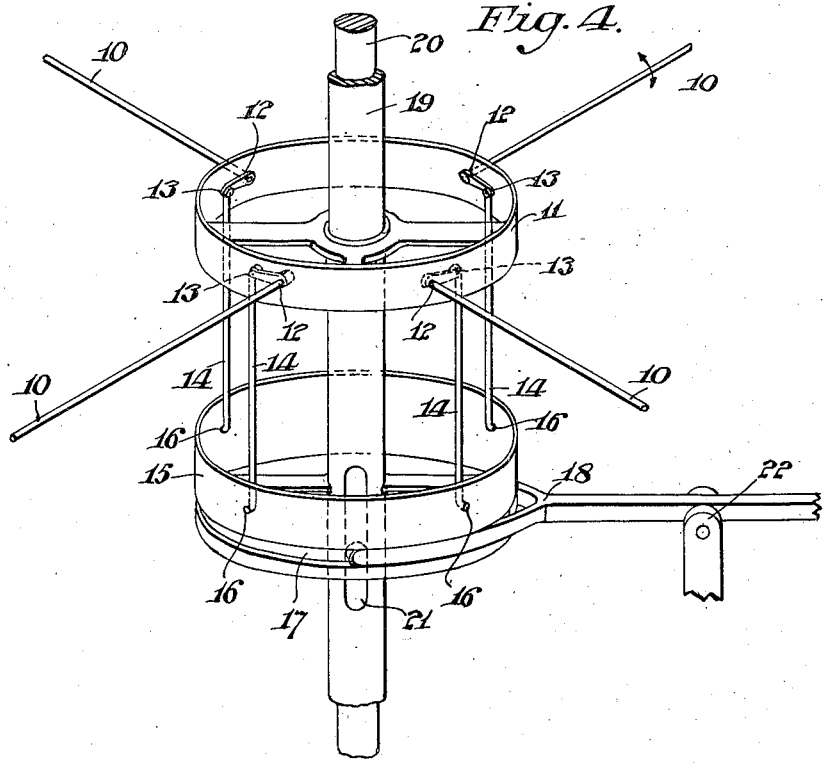
Inventor:
Christopher Robert Wilson,
By   Williamson
         Attorney.

Patented Aug. 4, 1936

2,049,482

UNITED STATES PATENT OFFICE 2,049,482

AIRCRAFT

Christopher Robert Wilson, Philadelphia, Pa., assignor of one-half to Harry Waldman, Philadelphia, Pa.

Application July 3, 1934, Serial No. 733,678

6 Claims. (Cl. 244—14)

My invention relates to new and useful improvements in aircraft and has for one of its objects to provide a revolving rotor concavo-convex in cross section with the open side underneath and having a plurality of airfoils or lifters hinged or pivoted thereto beneath the same whereby they may be angularly adjusted in a vertical direction.

Another object of this invention is to provide a rotor, having some of the characteristics of a parachute, in combination with lifters, resembling small planes, the whole being revolvable about the axis of the rotor and to be driven in any suitable manner or allowed to run free after the manner of "free wheeling", said rotor being mounted on an airplane body which latter is provided with an engine and other necessary attachments.

Another object of the present invention is to provide suitable supports for mounting the rotor and component parts on the airplane body with said rotor positioned at a suitable elevation above the airplane body and having means for controlling the rotor or parts thereof, some portions of the control means being located in the region of the pilot's station within easy access of the pilot.

A further object of my invention is to construct a device of the character stated which will operate to raise or lower an airplane perpendicularly at various speeds all under the control of the operator or pilot or automatically function as a revolving parachute and act as a safety device in the landing of the airplane.

A still further object of my invention is to provide a reliable and efficient device of the kind mentioned which will materially aid the initial launching of the aircraft as well as permit hovering of the aircraft above a predetermined location and which will assist in landing the aircraft at any point desired by the operator or pilot.

With these and other objects in view, this invention consists of the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 3 is an enlarged transverse sectional view through the rotor in the region of one of the lifters, and Fig. 4 is an enlarged perspective view of portions of the mechanism on which the rotor is mounted and for controlling the lifters.

Figure 1:
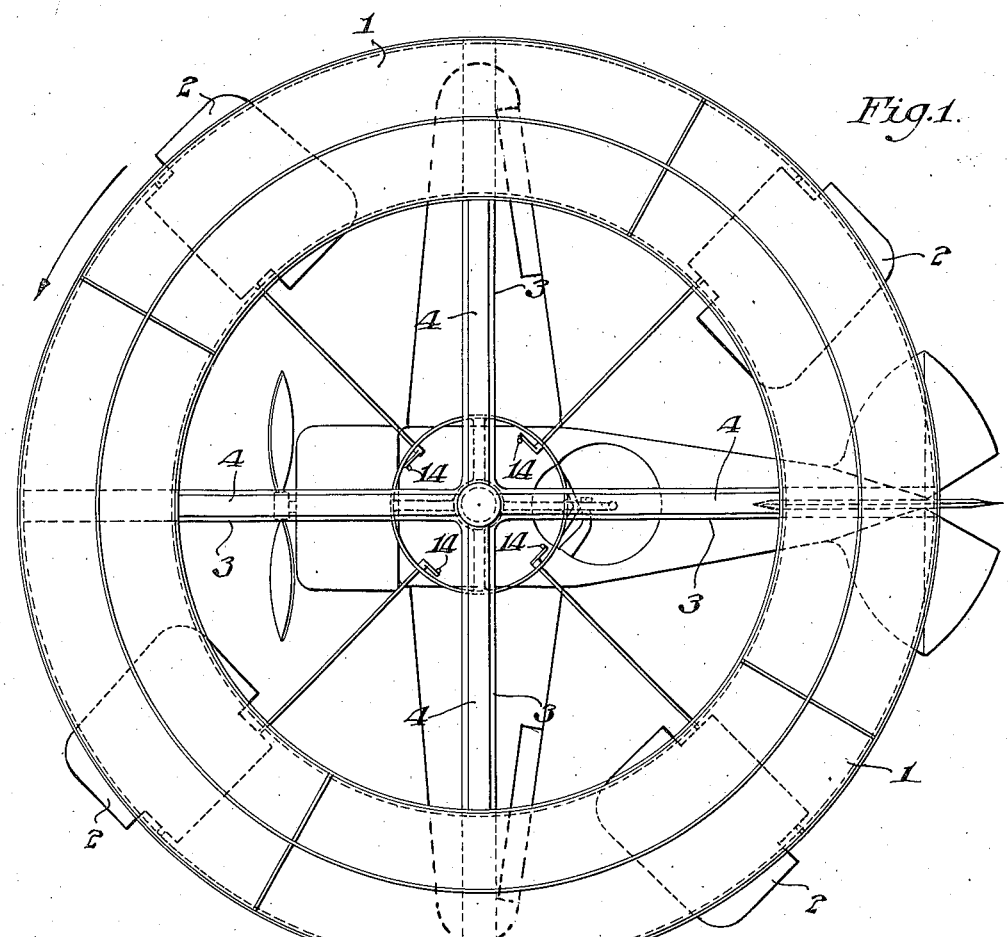
Fig. 1 is a top plan view of an aircraft embodying my invention.

In carrying out my invention as herein embodied, the reference character 1 represents the annular concavo-convex rotor with the open portion facing downward and underneath this rotor are hinged a plurality of lifters or airfoils 2 disposed across the under open part of said rotor.

Said rotor is supported by horizontal radial struts 3 connected to the edges of the rotor and inclined braces 4 attached to the inner edges of said rotor. The struts and braces are all connected to the vertical shaft or more particularly to the sleeve 5 mounted on the upper end of the vertical shaft.

The lifters or airfoils 2 are hinged to and underneath the rotor 1 by means of holders 6, one at each side of each lifter. These holders 6 are attached to the annular frame rims 7 and register with slots 8 in the sides of the lifters, which slots provide shoulders to limit the movements of said lifters.

Figure 2:
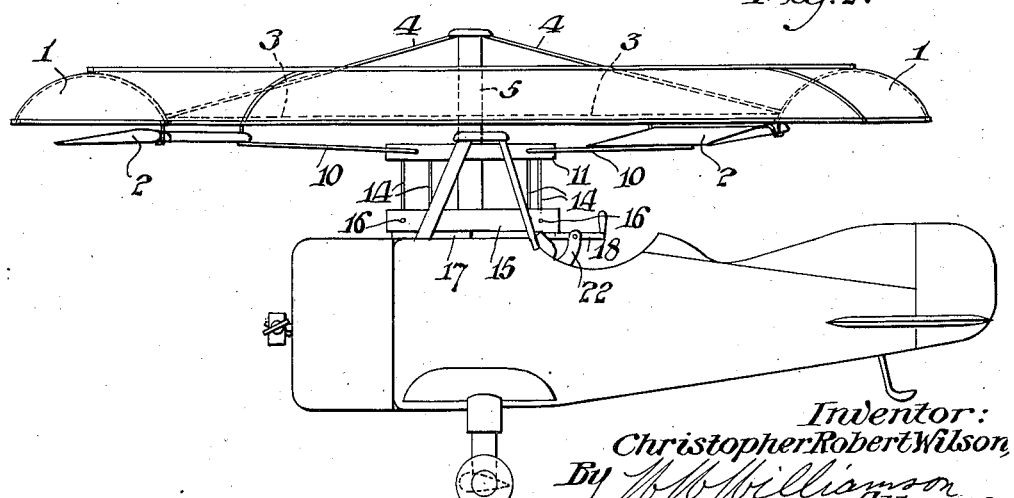
Fig. 2 is a side view thereof.

Hangers 9 are secured to both sides of each lifter and a shaft 10 is fixed in the pair of hangers of each lifter and journalled in the ring 11 which has holes 12 to receive the shafts 10. The ring 11 is supported by a hollow tube 19 mounted on the vertical shaft 20 to rotate therewith and said shaft is suitably secured to an airplane as shown in Figs. 1 and 2. On the inner ends of the shafts 10 are levers 13 to which are pivoted the upper ends of the connecting rods 14 while the lower ends of said rods are bent at right angles and mounted in holes 16 in the flanged collar 15 which moves longitudinally on the sleeve 19 and revolves therewith due to connection of suitable means with said sleeve through the medium of the slot 21.

In order to actuate the flanged collar 15, and the parts connected thereto so as to selectively change the angle of the lifters, I provide a Y-shaped shifting lever 18 pivoted in a bearing bracket 22 with the ends of the arms fitted in an annular groove 17 in the outer perimeter of said flanged collar 15.

The operation of the device is as follows:—As the rotor with its airfoils or lifters advances into the air stream caused by the forward motion of the airplane, the greatest lift is produced, at least theoretically, by a combination of the said stream, the rotary motion of the rotor and the slip stream which is deflected from the airplane propeller. All of these air currents flowing over the airfoils or lifters have, I believe, a tendency to create a vacuum above said airfoils thereby producing a pressure beneath them and at the same time causing pressure areas within the concavity of the rotor between the airfoils or lifters so that when said rotor is revolved at the proper speed the aircraft will be raised.

By diminishing the speed of revolution of the rotor the aircraft can be held in a substantially still position or the speed further reduced until gravity overcomes the lifting power at which time the aircraft will descend at any desired velocity.

Of course I do not wish to be limited to the exact details of construction herein shown and described, as these may be varied within the limits of the appended claims without departing from the spirit of my invention.

Having thus fully described my invention, what I claim as new and useful is:—

1. An aircraft rotor comprising an annular concavo-convex member, and lifters, hingedly mounted thereon and disposed directly across the open portion thereof.

2. An aircraft rotor comprising an annular concavo-convex member with its open portion underneath, and lifters hinged thereto in spaced relation directly across said open portion.

3. An aircraft rotor comprising an annular concavo-convex member with its open portion underneath, and a plurality of lifters hinged in equally spaced relation under the member and disposed directly across the open portion thereof.

4. The structure in claim 3, in combination with manually operable mechanism for selectively positioning the lifters at various angles.

5. An aircraft rotor comprising an annular concavo-convex member with its open portion underneath, a vertical shaft on which said member is revolvably mounted, a plurality of lifters hinged under the member and disposed directly across the open portion thereof, said lifters being arranged in equally spaced relation, and means to selectively vary the angular positions of said lifters.

6. An aircraft rotor comprising an annular concavo-convex member with its open portion underneath, a vertical shaft on which said member is revolvably mounted, said shaft being secured to and projecting above an airplane, a plurality of lifters hinged in spaced relation under said member and disposed directly across the open portion thereof, a ring revolvably mounted on the vertical shaft, lifter actuating shafts connected to the lifters and having their inner ends journalled in the ring, levers on the said inner ends of said lifter shafts, a collar slidably and revolvably mounted on the vertical shaft concentric with and spaced from the ring, connecting rods pivoted to the levers and attached to the collar whereby vertical movement of said collar will transmit motion through the connecting rods, levers and lifter actuating shafts to the lifters for selectively varying the angles of said lifters, and manually operable means for changing the elevation of the collar.

CHRISTOPHER ROBERT WILSON.